(12) United States Patent
Kuo et al.

(10) Patent No.: US 7,522,339 B2
(45) Date of Patent: Apr. 21, 2009

(54) HIGH CONTRAST PROJECTION SYSTEN

(75) Inventors: Huei Pei Kuo, Palo Alto, CA (US); Lawrence M. Hubby, Jr., Palo Alto, CA (US); Steven L Naberhuis, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 521 days.

(21) Appl. No.: 11/284,075

(22) Filed: Nov. 21, 2005

(65) Prior Publication Data
US 2007/0115547 A1 May 24, 2007

(51) Int. Cl.
*G03B 21/60* (2006.01)
*G03B 21/56* (2006.01)

(52) U.S. Cl. ..................... 359/459; 359/460

(58) Field of Classification Search ............. 359/443, 359/461, 460, 459, 449
See application file for complete search history.

(56) References Cited

U.S. PATENT DOCUMENTS

| | | | |
|---|---|---|---|
| 4,929,048 A | 5/1990 | Cuypers | |
| 6,282,023 B1 * | 8/2001 | Bergman | 359/449 |
| 6,550,937 B2 | 4/2003 | Glass | |
| 6,571,043 B1 | 5/2003 | Lowry et al. | |
| 6,597,501 B2 * | 7/2003 | Lambert et al. | 359/449 |
| 6,728,032 B2 * | 4/2004 | Peterson et al. | 359/460 |
| 6,829,095 B2 | 12/2004 | Amitai | |
| 7,262,911 B2 * | 8/2007 | Niwa et al. | 359/459 |
| 7,314,281 B2 * | 1/2008 | Katase et al. | 353/77 |
| 2005/0180004 A1 | 8/2005 | Sekiguchi | |
| 2006/0007536 A1 * | 1/2006 | Huang | 359/457 |
| 2006/0176554 A1 * | 8/2006 | Kuo et al. | 359/460 |

FOREIGN PATENT DOCUMENTS

EP           0938694 B1    9/2002

OTHER PUBLICATIONS

JP 2005 107011 A (Daicel Chem) Apr. 21, 2005; Abstract.
"High Contrast Front Projection Display System Optimizing the Projected Llght Angle Range" Baku Katagiri, Takahiro Ishinabe, Tetsuya Miyashita, and Tatsuo Uchida, Department of Electrics, Graduate School of Engineering, Tohoku University, Aza Aoba 05, Aramaki, Aoba-ku, Sendai 980-8579, Japan (IDW 2003).

* cited by examiner

*Primary Examiner*—Christopher E Mahoney

(57) ABSTRACT

In a particular, a high contrast projection system configured for front or rear projection includes a screen having a viewing side and a back side opposite thereto. The screen includes a transparent layer of material having louver members disposed therein to provide fractional reflective coverage across the width of the transparent material. The screen discriminates an image signal light from a source, such as a projector, from ambient light incident upon the viewing surface. The image signal light is redirected over a range of angles relative to a normal to the viewing side, while the majority of ambient light is directed generally toward the back side, for example passing through the transparent material between louver members. A light absorbing back panel adjacent to the back side absorbs the ambient light further improving contrast.

30 Claims, 9 Drawing Sheets

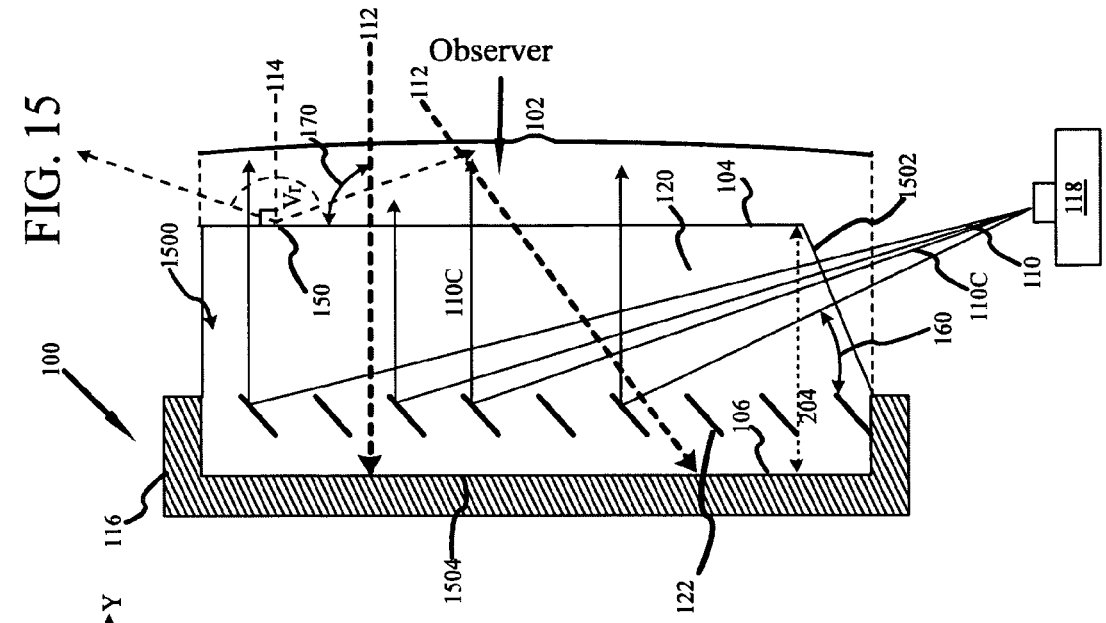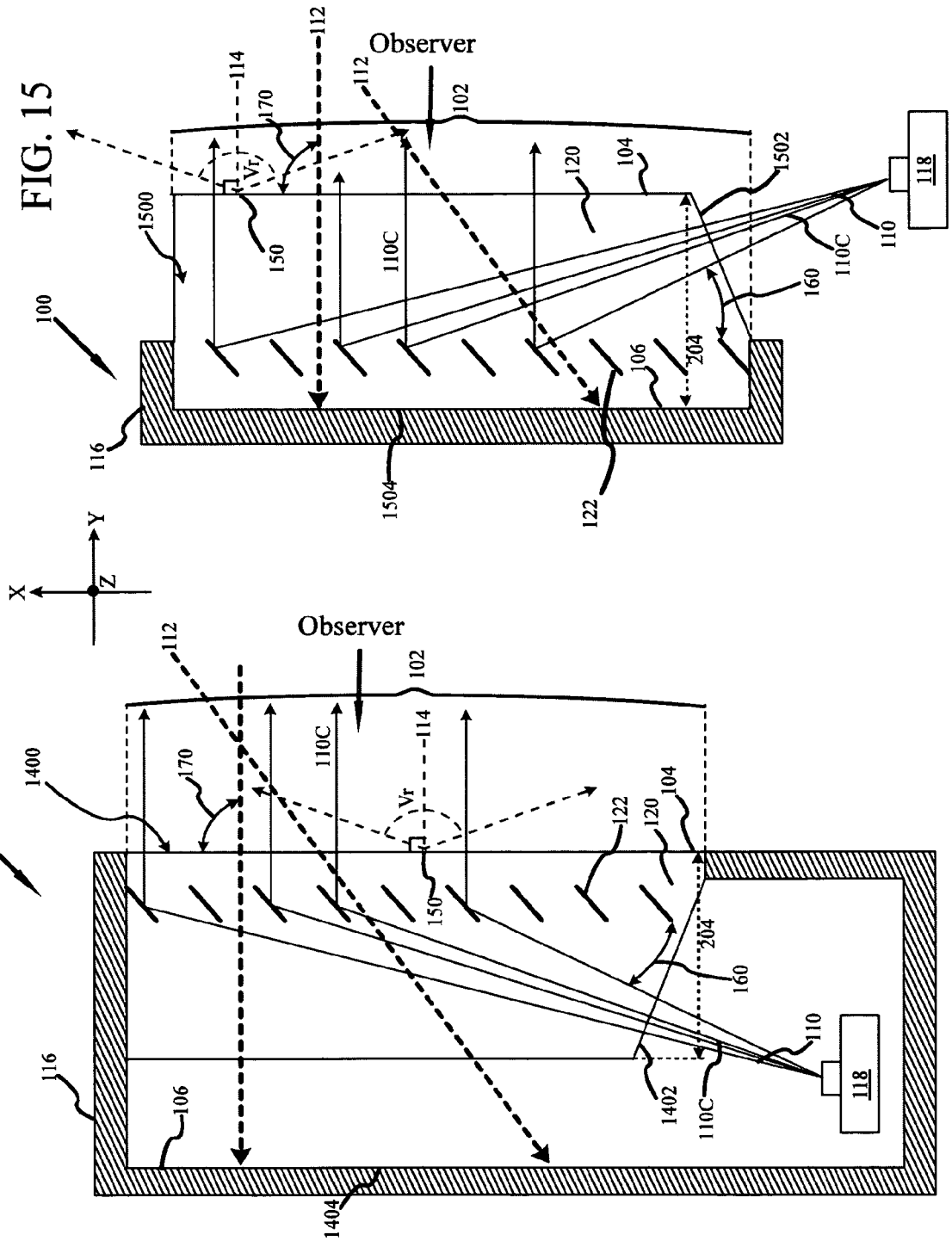

HIGH CONTRAST PROJECTION SYSTEM

FIELD

This invention relates generally to the field of display devices and, in particular, to a louver device for a projection display.

BACKGROUND

Socially and professionally, most people rely upon video displays in one form or another for at least a portion of their work and/or recreation. With a growing demand for large screens, such as high definition television (HDTV), cathode ray tubes (CRTs) have largely given way to displays composed of liquid crystal devices (LCDs), plasma display panels (PDPs), or front or rear projection systems.

A CRT operates by scanning electron beam(s) that excite phosphor materials on the back side of a transparent screen, wherein the intensity of each pixel is commonly tied to the intensity of the electron beam. With a PDP, each pixel is an individual light-emitting device capable of generating its own light. With an LCD, each pixel is a back-lit, light modulating liquid crystal device.

As neither system utilizes a large tube, LCD and PDP screens may be quite thin and often are lighter than comparable CRT displays. However, the manufacturing process for LCDs, PDPs and most other flat panel displays is much more complex and intensive with respect to both equipment and materials than that of CRTs, typically resulting in higher selling prices.

Projection systems offer alternatives to PDP and LCD based systems. In many cases, projection display systems are less expensive than comparably sized PDP or LCD display systems. Rear projection display systems typically employ a wide angle projection lens (or multiple lenses), operating in connection with one or more reflective surfaces to direct light received from the projector through the lens(es) to the back of a screen. The lens and mirror arrangement typically enlarges the image as well. To accommodate the projector, one or more lenses, and reflectors, rear projection displays are typically 18 to 20 inches deep and as such may not be suitable for on-wall mounting in some environments.

Often, rear projection display devices exhibit average or below average picture quality in certain environments. For example, the brightness and contrast of the images on the rear projection displays may be degraded substantially off axis or when lighting conditions vary within the environment. Light output and contrast is a constant issue in most settings and viewing environments.

A display may also have to contend with two types of contrast—dark-room contrast and light-room contrast. Dark-room contrast is simply the ratio between the intensity of light and dark image objects with minimal ambient illumination such as in a controlled dark room with black walls, ceiling, floor and furniture. Light-room contrast is similarly the ratio between the intensity of light and dark image objects in a lighted environment, such as a living room illuminated with typical household lighting fixtures or at daytime.

Front projection systems typically use a screen to reflect incident light back toward an observer. A typical front projection screen usually reflects equally well the light from the imaging source and the ambient light. They provide good dark-room contrast where ambient light is low but are subject to poor light-room contrast due to the interference of ambient light. Specifically, ambient light incident upon the screen may be reflected back to the viewer and thus compete with the intended image. In a room with well designed illumination intended to provide a uniform lighting level, the ambient illumination raises the illumination intensity on the screen more or less uniformly and thus reduces the contrast and perceived quality of the intended image.

Rear projection displays and emissive displays such as LEDs, LCDs and PDPs typically provide better light room contrast than front projection systems. Fabrication and material costs tend to make these emissive displays more costly then projection display systems. Rear projection systems are typically more complex than front projection systems. This complexity typically translates into a higher sales price as well.

Weight, thickness, durability, cost, aesthetic appearance, and quality are key considerations for display systems. Hence, there is a need for a device that overcomes one or more of the drawbacks identified above.

SUMMARY

This invention provides a high-contrast projection system.

In particular and by way of example only, according to an embodiment, provided is a high-contrast projection system, including: a screen having a viewing side and opposite thereto a back side, the screen structured and arranged to discriminate an image signal light from an ambient light incident upon the viewing side or the back side surface, the image signal light redirected into a range of angles, the range of angles centered about a normal to the viewing side, the majority of ambient light directed generally towards the back side; and a light absorbing back panel adjacent to the screen back side.

BRIEF DESCRIPTION OF THE DRAWINGS

FIG. 14 is a side view of a high contrast projection system according to yet still another embodiment; and FIG. 15 is a side view of a high-contrast projection system according to yet further still another embodiment.

DETAILED DESCRIPTION

Before proceeding with the detailed description, it is to be appreciated that the present teaching is by way of example, not by limitation. The concepts herein are not limited to use or application with a specific high contrast projection system. Thus, although the instrumentalities described herein are for the convenience of explanation, shown and described with respect to exemplary embodiments, it will be appreciated that the principles herein may be equally applied in other types of high contrast projection system systems.

Figure 1:
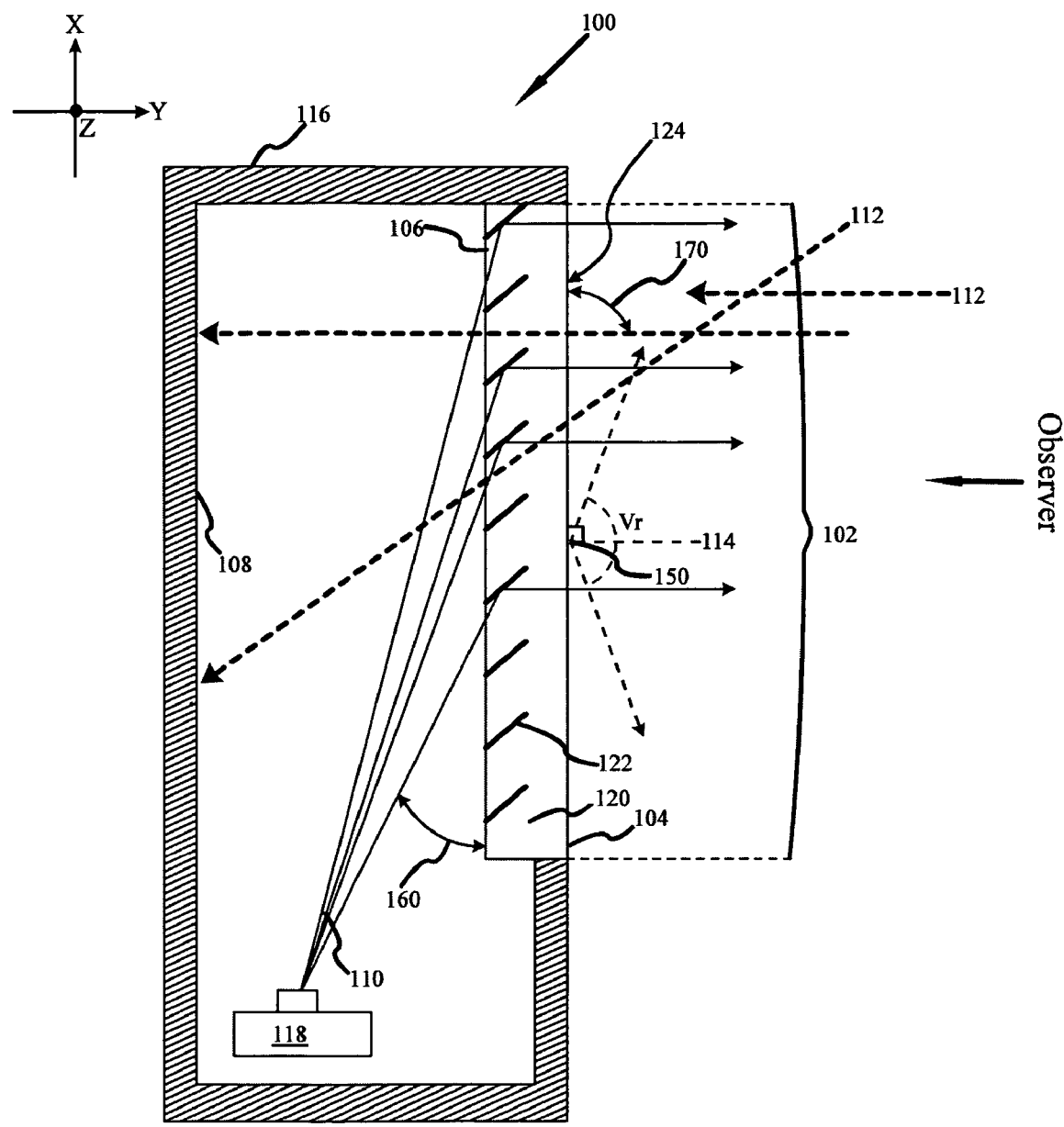
FIG. 1 is a side view of a high-contrast projection system according to an embodiment.

FIG. 1 conceptually illustrates a portion of a high-contrast projection system 100. In at least one embodiment, the high-contrast projection system 100 has a screen 102 having a viewing side 104 and opposite thereto a back side 106. A light absorbing surface such as light absorbing back panel 108 is adjacent to the back side 106.

Figure 9:
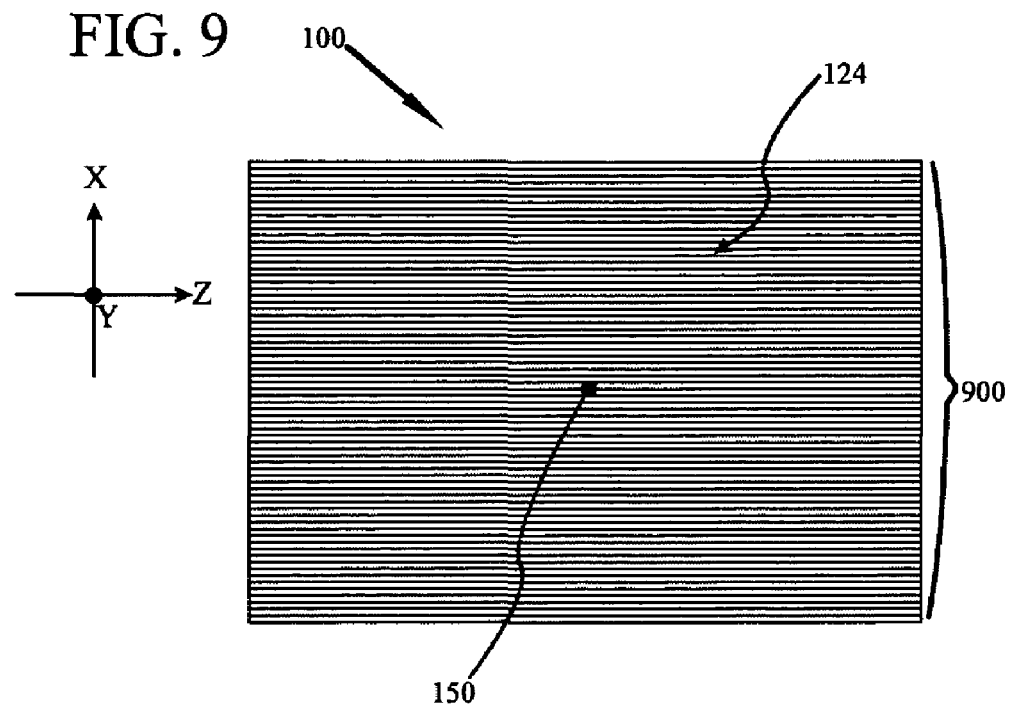
FIG. 9 is a front view of louver screen showing parallel rows of louver members according to an embodiment.
Figure 10:
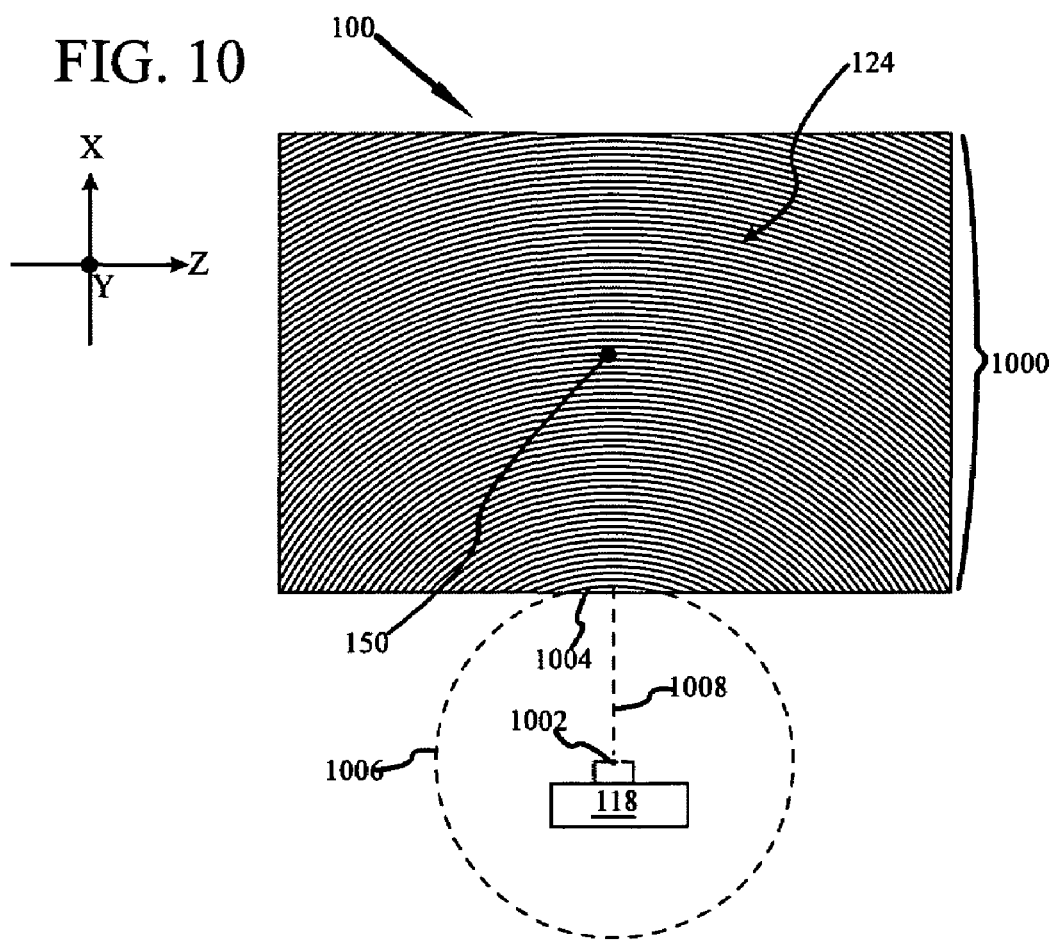
FIG. 10 is a front view of louver screen showing curved rows of louver members according to yet another embodiment.

To facilitate the description, the orientations are referenced to the coordinate system with three axes orthogonal to one another as shown in FIG. 1. The coordinate system is chosen to be fixed to the screen 102. The axes intersect mutually at the origin of the coordinate system, which is chosen to locate at the center 150 of the viewing surface 104 as indicated in FIGS. 1, 9 and 10. The axes shown in all the figures are offset from their actual locations for clarity.

In a typical installation, the screen might be hung on a vertical wall for viewing by observers standing up or sitting upright. In this implementation the X-axis is chosen to be pointing in the vertical direction with the positive direction of the X-axis pointing upwards. The axis that is pointing in the horizontal direction and is perpendicular to the viewing surface of the screen 104 is chosen to be the Y-axis. Regardless of the actual orientation of the screen, the X-axis hereafter might be referred to as the vertical axis. The direction along the X-axis hereafter might be referred as the vertical direction or the X-direction. The Y-axis hereafter might be referred to as the horizontal-normal axis and the direction along the Y-axis as the horizontal-normal direction or the Y-direction. The positive Y-direction points toward the observer. The Z-axis is in the plane of the viewing side surface 104 and is perpendicular to the X-axis and the Y-axis. Hereafter the Z-axis might be referred to as the horizontal-in-plane axis and the direction along the Z-axis as the horizontal-in-plane direction or the Z-direction. The positive Z-direction points to the observer's right when the observer is facing the screen from the viewing side. A plane that contains the X-axis and any planes parallel to it hereafter might be referred to as vertical plane. A plane that contains both the Y-axis and the Z-axis and any planes parallel to it hereafter might be referred to as horizontal plane. Unless otherwise specified, the positive directions of the axes are indicated by an arrow head in the Figures.

As is more fully described below, the screen is structured and arranged to discriminate an image signal light 110 from an ambient light 112 incident upon the viewing side 104. In addition, the image signal light 110 is redirected into a range of angles Vr in a vertical plane, the range centered about a normal 114 to the viewing side 104 as shown in FIG. 1, and 11~15. Similarly the signal light is redirected into a range of horizontal angles, Hr, in a horizontal plane. Hr is not shown in the figures. The ranges Vr and Hr might be tailored to be different from each other to suit specific applications. For example Hr could be tailored to be less than about ten degrees (10°) for privacy and made to be nearly one hundred eighty degrees (180°) for comfortable viewing in a home theater environment. The majority of the ambient light 112 is directed generally towards the back side 106. For ease of illustration and understanding the light rays 110 and 112 are shown as following straight paths entering or leaving the screen sides 104 and 106. It is to be understood and appreciated that the light rays 110 and 112 undergo a change of direction governed by the Fresnel law of refraction at the interfaces.

In the embodiment as shown, the high contrast projection system 100 is a rear projection system 100, having a case 116 supporting the screen 102. The light absorbing back panel 108 is disposed within the case 116, and in at least one embodiment is the inner surface of the case 116, as shown. An image source 118 is disposed within the case 116 and below the screen 102.

Image source 118 for a rear projection system may be any device capable of providing a focused image on the back side 106 of the screen, such as, for example, a projector. Image source 118 is not limited simply to this example, and may also include combinations of devices. As is further discussed below, image source 118 provides an image in the form of image signal light 110 at an angle 160 that is substantially smaller than ninety degrees (90°) relative to screen 102, as shown in FIG. 1. The ambient light 112 provided by at least one ambient source (not shown) at locations separate and apart from the image source 118. Moreover, in at least one embodiment, the screen 102 is structured and arranged to discriminate the image signal light 110 presented from a first location from the ambient light 112 presented from a second location.

In at least one embodiment the screen 102 consists of a transparent layer 120 of material and a plurality of louver members 122 at least partially disposed within the transparent layer 120. As in at least one embodiment, the louver members 122 are physical structures, the assembled structure may be referred to as a louver screen 124. As is set forth in greater detail below, in at least one embodiment the louver members 122 present a fractional reflective area relative for light rays 112 that impinge on the louver screen 102 from the viewing side with an angle 170 that is from about ninety degrees or less ($\leq 90°$) as measured from the positive X-axis to the positive Y-axis, and a continuous reflective area for the light rays 110 that impinge on the louver screen 124 from an angle 160 that is substantially less than ninety degrees (90°) as measured from the negative X-axis to the negative Y-axis.

Figure 2:
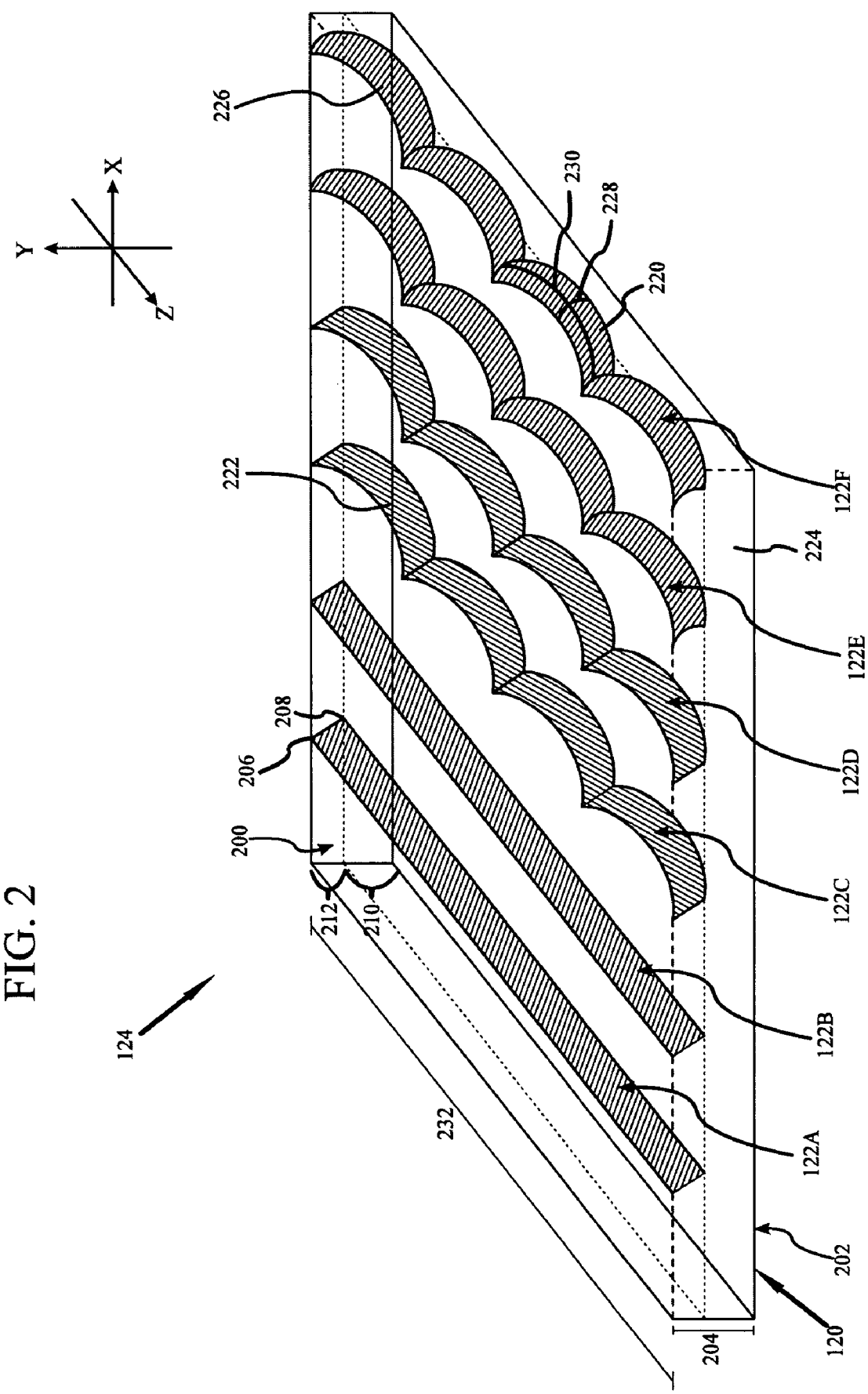
FIG. 2 is a perspective view of a louver screen shown in FIG. 1 according to an embodiment.

The nature of the louver screen 124 is further shown in FIGS. 2 through 10. FIG. 2 conceptually illustrates an enlarged partial perspective view of louver screen 124. In the embodiment shown, louver screen 124 consists of a transparent layer 120 of material having a first side 200 and opposite thereto a second side 202, and a thickness 204 therebetween.

A plurality of louver members 122 are disposed within the transparent layer 120, specifically, exemplary louver members 122A-122F. Each louver member 122 has a first end 206 and a second end 208. As shown, the first end 206 of each louver member is adjacent to the first side 200. The second end 208 of each louver member is proximate to the second side 202. Moreover each louver member 122 has a component 212 normal to first side 200, the component 212 being a fraction of thickness 204.

In at least one embodiment as shown, second end 208 defines a space 210 between the second end 208 and the second side 202. In at least one embodiment, this space 210 serves as added support and/or protection for louver members 122. In an alternative embodiment, the second end 208 may be substantially adjacent to second side 202 such that space 210 does not exist as an integral component of transparent layer 120. In such embodiments, protection and/or support may be provided by an additional transparent layer joined to transparent layer 120 in the illustrated location of space 210.

Figure 13:
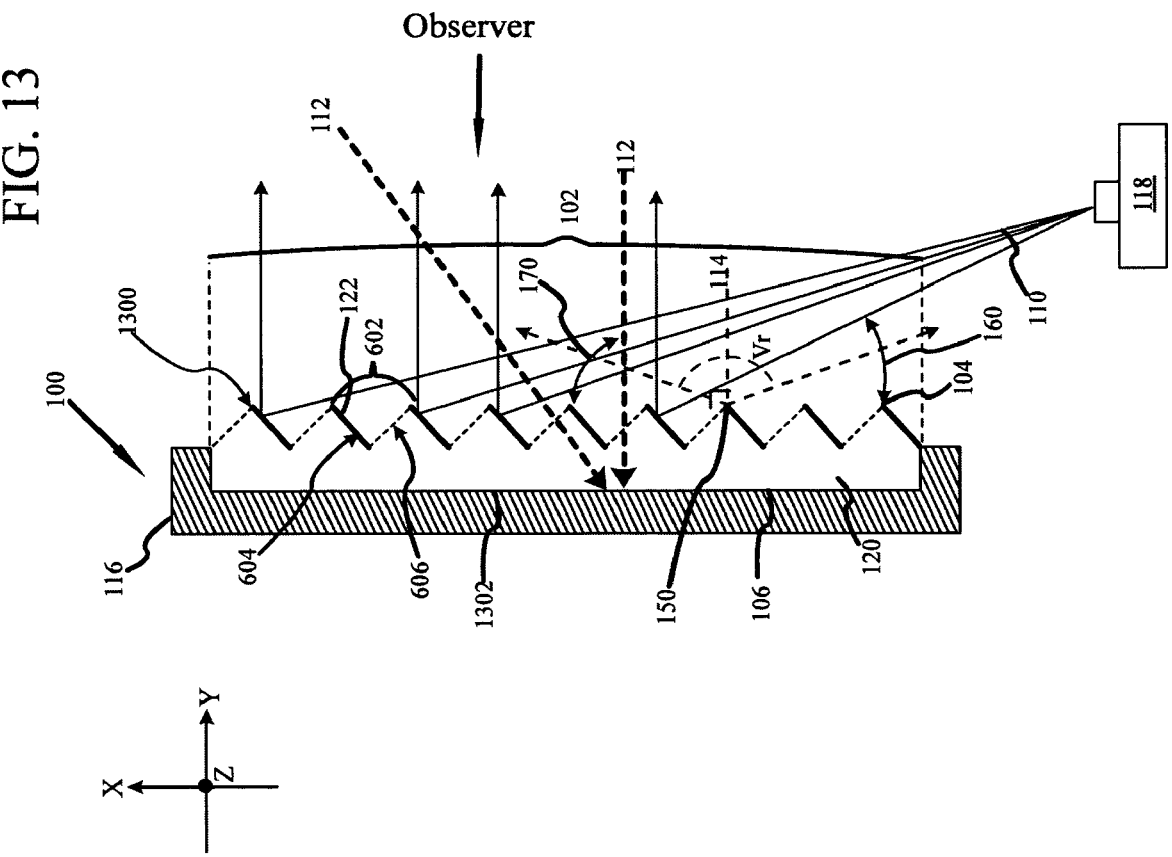
FIG. 13 a side view of a high-contrast projection system according to still another embodiment.

In at least one embodiment the louvers 122 are reflective thin film with a thickness of about zero point one (0.1) μm deposited on the grooved surface of the transparent layer 120 as shown in FIG. 13. In another embodiment, the louvers 122 may consist of a conglomerate of reflective particles, each with a linear dimension of about one to one hundred (1-100) μm, closely packed and adhered to the grooved surfaces of the transparent layer 120. The grooved surface may be planarized with another layer of transparent material, not shown, to protect the louvers. The material of reflective particles may be, for example, titanium dioxide or aluminum oxide.

Figure 3:
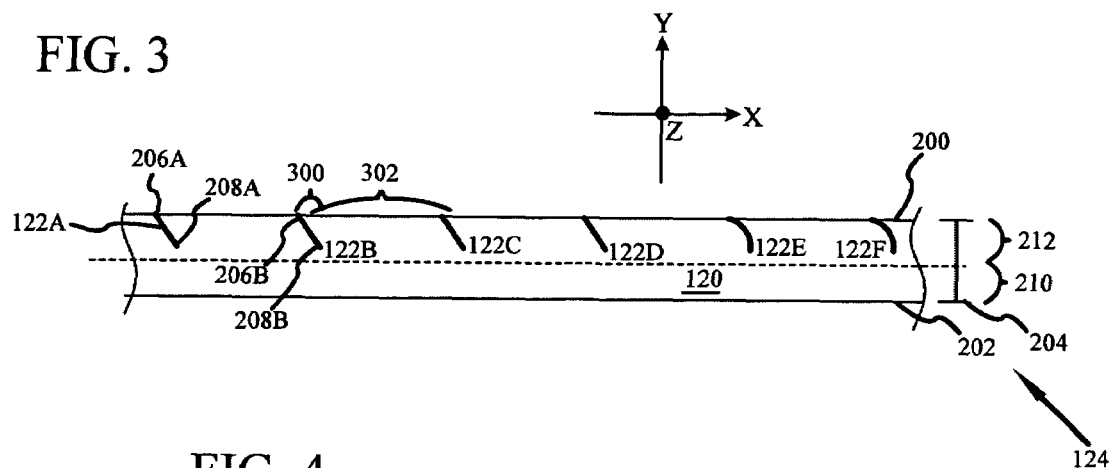
FIG. 3 is a partial side view of the louver screen shown in FIG. 2.
Figure 4:
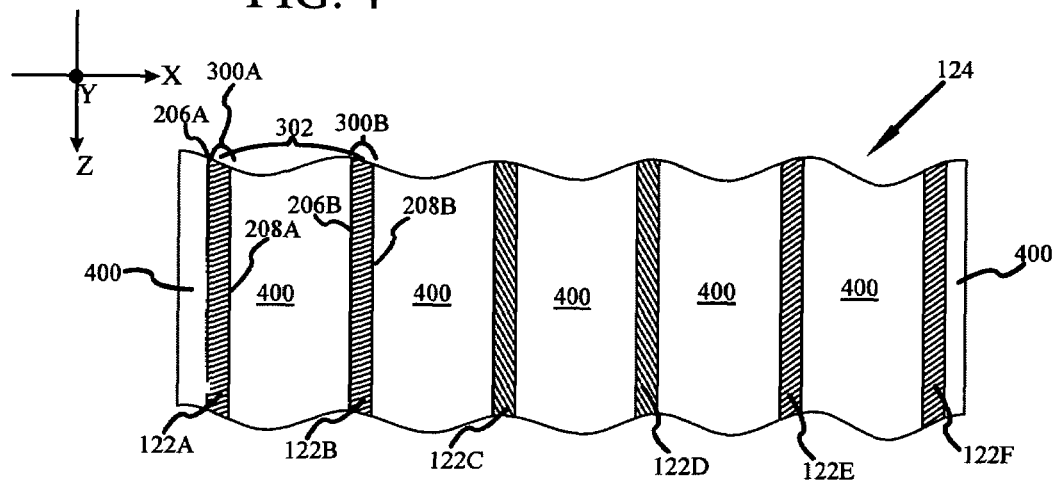
FIG. 4 is a plane view of the projected louver elements shown in FIG. 3.

FIG. 3 is a side view of the louver screen 124 shown in FIG. 2, specifically showing the edge view of louver members 122A~122F in the XY plane. FIG. 4 illustrates the projected components of the louver members 122A-122F onto a plane 400 that is parallel to the first side 200, i.e., plane 400 is a XZ plane. Each louver member 122 has a projected component 300 in plane 400.

In at least one embodiment as shown, the projected second end 208A of louver member 122A does not overlap the projection of the first end 206B of adjacent louver member 122B, such that the projected component 300A is a fraction of the center-to-center distance 302 between adjacent louver members 122, e.g., louver members 122A and 122B as shown. Moreover, in at least one embodiment, there are transparent areas 402 in plane 400 between projected components 300. In at least one alternative embodiment, not shown, there may be overlap between respective second ends 208 and first ends 206 such that the projected component 300 is at least equal to the center-to-center distance 302 between adjacent louver members 122.

Figure 5:
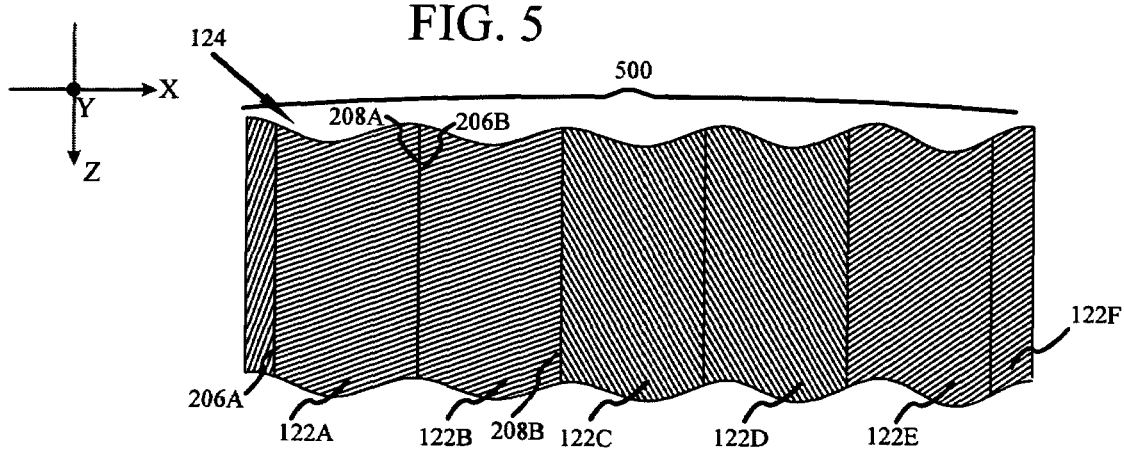
FIG. 5 is an angled view of the louver screen shown in 1, 2-4 showing the substantially continuous reflective surface provided by the louver elements.
Figure 12:
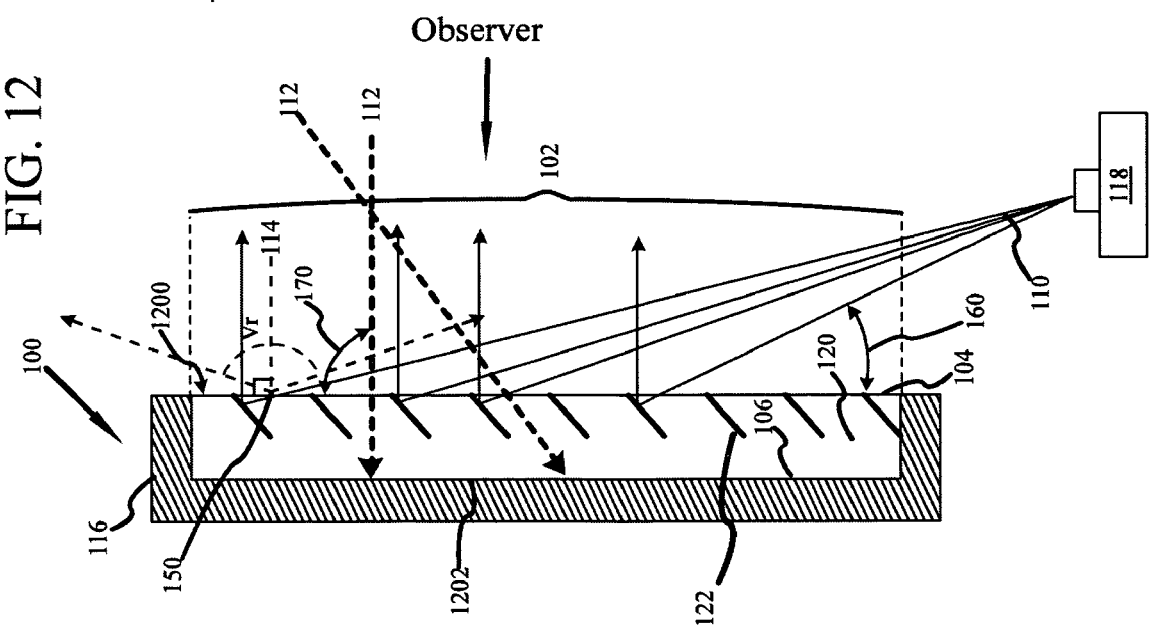
FIG. 12 a side view of a high-contrast projection system according to yet another embodiment.

With respect to FIG. 4, it is appreciated that in at least one embodiment, light rays impinging on louver layer 124 substantially along the Y-axis (e.g. an angle normal to the first side 200) encounter a fractional reflective area provided by the louver members 122. For purposes herein, a "high angle" of approach is understood and appreciated as an angle 170 that is substantially equal to or less than ninety degrees (90°) to side 200, corresponding to side 104 as shown in FIGS. 1, 12 and 13. In at least one embodiment, the reflective area is a small fraction of the transparent area. As shown in FIG. 5, when the light rays impinge upon louver layer 124 with an angle 160 that is substantially less than ninety degrees (90°) as shown in FIGS. 1, 12 and 13, the louver members may appear to present a continuous reflective area 500. For purposes herein, a "low angle" or "shallow angle" of approach is understood and appreciated to be the angle 160 that is substantially less than ninety degrees (90°).

As used herein, the term "transparent" is generally defined to include the definitions of "capable of transmitting light so that objects or images can be seen as if there were no intervening material," and "easily seen through." In at least one embodiment, transparent layer 120 may be aptly described as translucent; in that transparent layer 120 may be colored, polarized and/or intentionally diffusing.

Returning to FIG. 2, in at least one embodiment, the louver members 122 are aligned to receive light entering the first side 200 at a shallow angle relative to the first side 200 and direct the light out the second side 202 at a range of angles that is typically symmetrical about the Y-axis.

Each louver member 122 has a reflective surface 220. In at least one embodiment this is a textured surface, and in an alternative embodiment it is a smooth surface. In another embodiment, the louver member consists of at least one layer of closely packed particles with linear dimensions of about one to one hundred (1-100) μm. The louver members 122 may take many forms. Exemplary louver members 122A~122B are substantially flat members. Exemplary louver members 122C~122D include cylindrical mirror sections, e.g., a mirror segment 222 of louver member 122C has a curved cross-section along the first side 200 and a straight cross-section along a side 224 of transparent layer 120. Exemplary louver members 122E~122F include elliptical mirror segments, e.g., mirror segment 226 of louver member 122F has a curved cross-section along the first side 200 and a curved cross-section along side 224.

Moreover, in at least one embodiment, the louver members 122 are shaped louver members. More specifically, in at least one embodiment, each surface 220 has at least one first curvature 228 along a first axis (e.g., Y-axis) an at least one second curvature 230 along a second axis (e.g., Z-axis) transverse to the first axis.

In addition, the shaped louver members 122 are grouped into at least one subgroup, the shaped louver members 122 within the subgroup being systematically arranged in one embodiment, and randomly distributed in an alternative embodiment. Further, the size and shape of each shaped louver member 122 may be smaller than each image pixel. Further still, in at least one embodiment, the shaped louver members 122 are provided by reflective particles rather than a continuous film of material.

Figure 6:
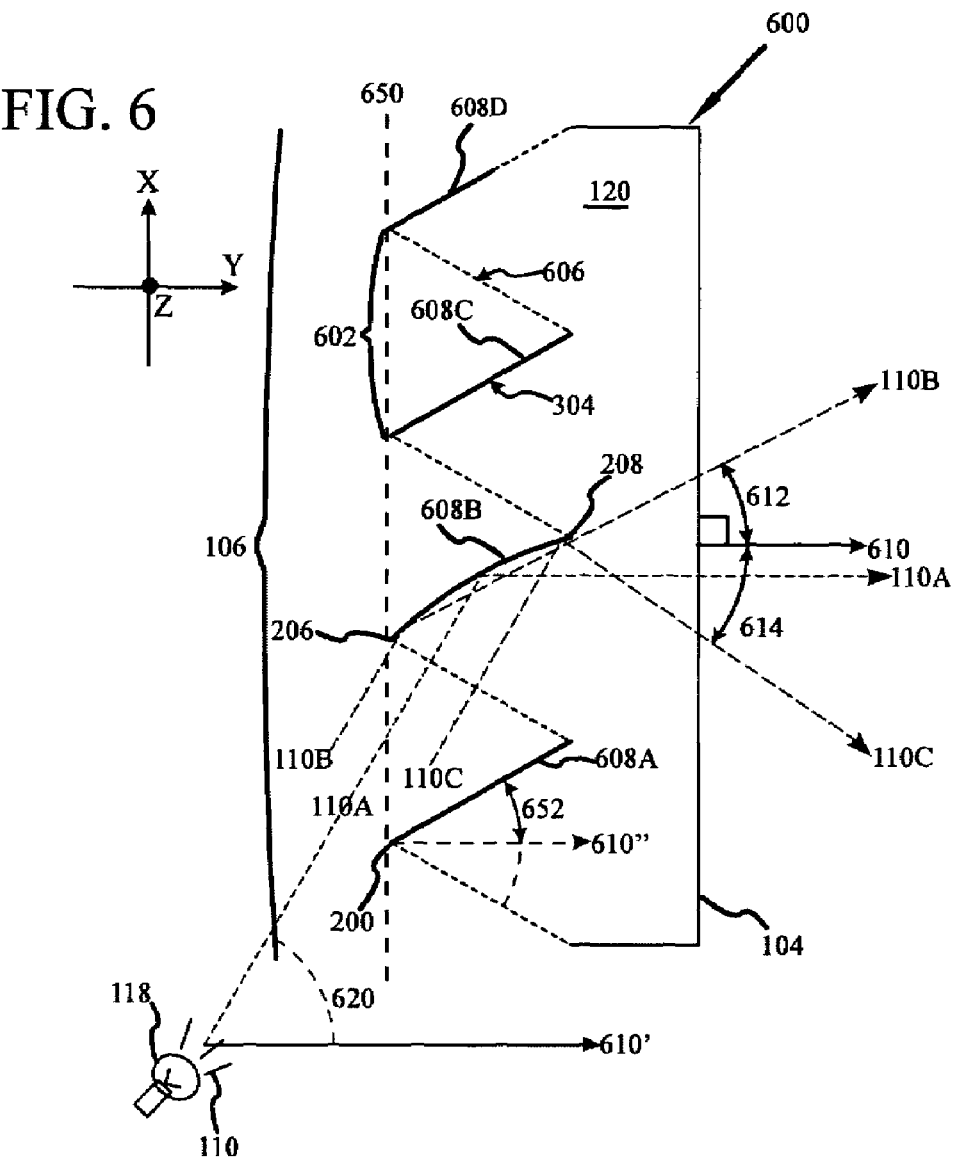
FIG. 6 is an enlarged cross-section view of an alternative embodiment of a louver screen according to an embodiment.
Figure 8:
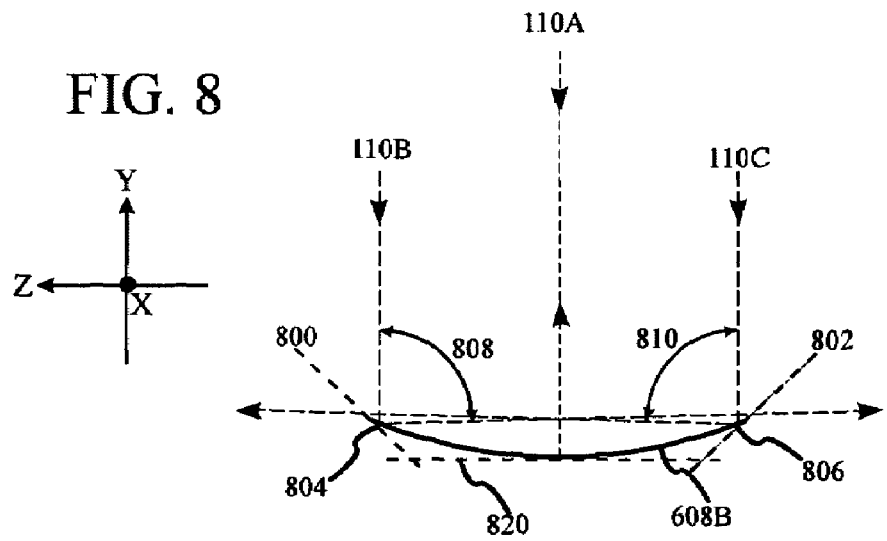
FIG. 8 is a top view of a louver element shown in FIG. 7.
Figure 7:
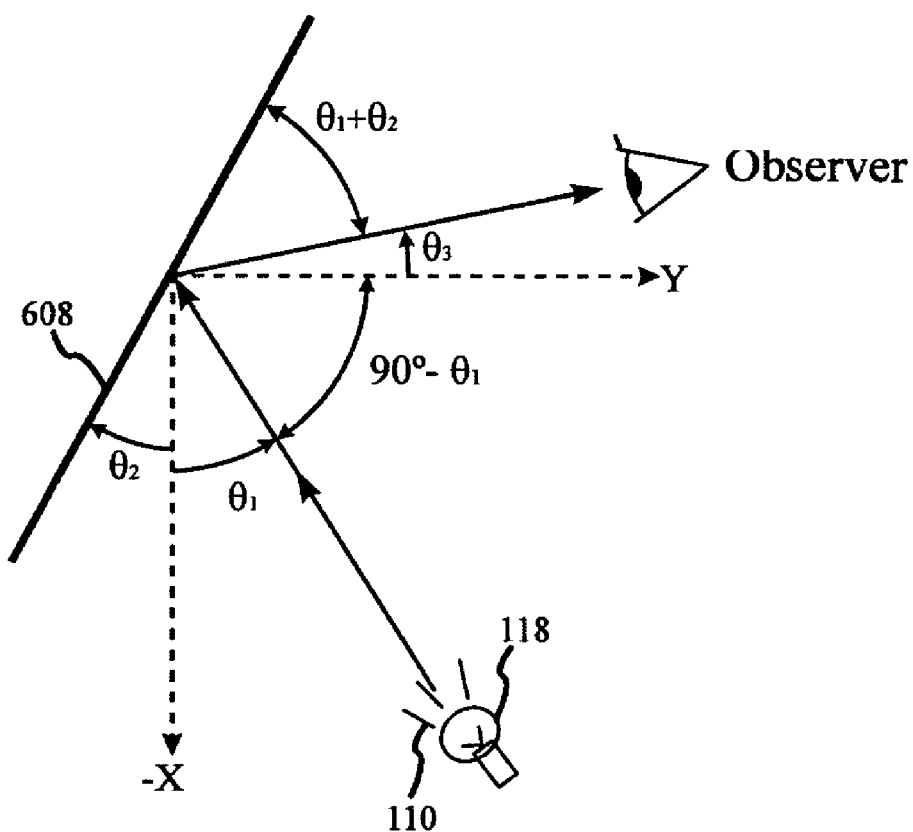
FIG. 7 illustrates the optimal louver alignment angles and reflected/refracted components for incident light.
Figure 7:
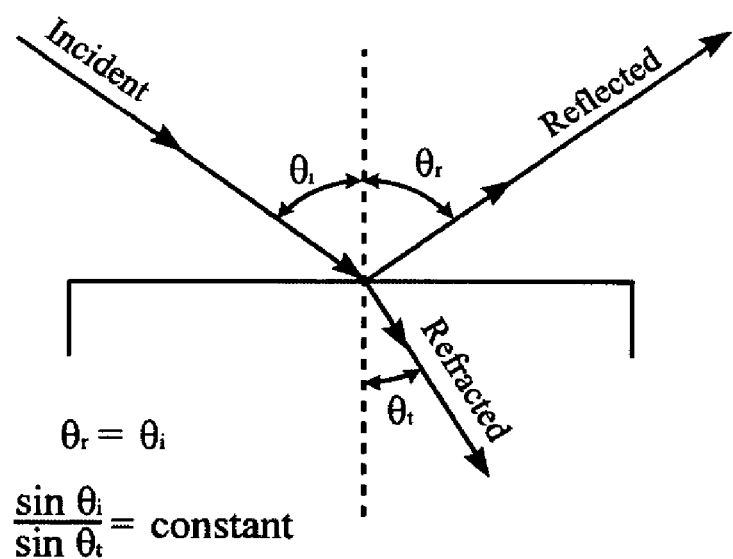

As stated above, in at least one embodiment, at least one advantageous aspect of high contrast projection system 100 is that the louver screen 124 is structured and arranged so that each louver member receives the image signal from a source at a range of angles, which is typically less than about one degree (1°) and redirect the image signal into a range of angles centered about a normal to the viewing side of the screen. Multiple image sources may be used to increase the brightness and resolution. FIGS. 6, 7 and 8 are provided to further illustrate this aspect of high contrast projection system 100.

FIG. 6 presents an enlarged cross-section view of an embodiment of a louver screen 600 in an XY plane. As shown, louver screen 600 has a transparent layer 120 shown to have a plurality of grooves 602, each groove having at least a first surface 604 intersecting a second surface 606. These grooves establish first side 200 as a grooved side. The dashed line 650 connecting the apexes of the grooves represents the virtual plane of the grooved side. Louver members 608, of which louver member 608A~608C are exemplary, are established in at least one embodiment by disposing a reflective material upon each first surface 604. In at least one embodiment, the reflective material is deposited on a fraction of first surface 604 as exemplified by louver member 608D.

The second surface 606 is not coated and therefore remains transparent, and is thus shown as a dotted line. In at least one embodiment, the second surface 606 is substantially perpendicular to the virtual plane 650. In another embodiment the second surface is substantially perpendicular to the image light 110. Such a process may also be employed for the fabrication of louver screen 124; however, in the case of louver screen 124, the grooves may be filled and planarized to provide a substantially smooth first side 200, such as the plane represented by dotted line 650. It is of course understood and appreciated that louver members 608 are substantially identical with louver members 122; however, a different numbering convention has been applied in FIG. 6 for ease of discussion.

The relationship between the angle of incidence and the angle of reflection by the louver members is conceptually illustrated in FIG. 7. With respect to FIG. 7, the relationship between $\theta_1$, the incident angle of light from the image source, $\theta_2$, the angle of the louver reflector, and $\theta_3$, the nominal viewing angle, may be expressed by Equation 1 below:

$$\theta_1+2\theta_2+\theta_3=90°$$ Equation 1:

The angles $\theta_1$ and $\theta_2$ are measured with respect to the negative X-axis and the angle $\theta_3$ is measured with respect to the positive Y-axis. The positive directions of the angles are indicted by the arrow heads. Typically the screens are designed for the observers to view the screen around a nominal viewing angle $\theta_3=0°$. Examples of the orientations for the louver mirrors to achieve this viewing condition are summarized below:

For a front projector with an incident angle $\theta_1=30°$, optimal reflector angle is $\theta_2=30°$ For a rear projector with an incident angle of $\theta_1=-30°$, the optimal reflector is $\theta_2=60°$ Instead of a flat reflector, the reflecting surface of the louver may be curved to produce the ranges of viewing angles as indicated by the angular range Vr and Hr introduced earlier. Curved louvers are discussed in further detail below.

FIG. 7 depicts a portion of a single louver member 608. In addition, louver member 608 is shown as not being embedded in the transparent layer, and the light from imaging source 118 is not passing through the transparent layer before striking the louver member 608. Thus the incident light form the image source 118 and the reflected light from the louver member 608 are assumed to be in the same optical medium, for example air. As shown, single louver member 608 may be a component of a front projection embodiment as is further described below.

When the image light passes into the transparent layer before striking the louver member, as in FIG. 6, or when the louver members are embedded in the transparent layer as in FIGS. 1 and 2, the light rays undergo an additional change of direction as it enters and leaves the transparent layer by the amount shown in FIG. 7. These additional angular changes may be calculated and accounted for in the structure and arrangement of the louver members in such embodiments so as to compensate for these additional changes in the directions of the incident and reflected light rays. These additional angular changes are not shown in the other figures so as to minimize confusion.

Returning to FIG. 6, in at least one embodiment for a rear projection system, the viewing-side plane 104 is parallel to the virtual back plane 650. The image signal light 110 impinges upon the back side 106 at an angle 620 of about sixty degrees (60°) relative to normal 610' that is perpendicular to the virtual back-side plane 650. Normal 610' is also parallel to a normal 610 of the viewing side 104. Both normals 610 and 610' are parallel to the Y-axis. To redirect the incident light into the Y-direction, the louver members 608 are angled at about thirty degrees (30°) relative to 610", shown as angle 652. This corresponds to the condition where the incident angle $\theta_1=-30°$ and the louver angle $\theta_2=60°$ in FIG. 7.

In an alternative embodiment for front projection (not shown), the image signal light 110 impinges upon the viewing side 104 at angle of about sixty degrees (60°) relative to normal 610. The louver members 608 are aligned at about sixty degrees (60°) relative to normal 610 to the viewing side 104. This corresponds to the condition where the incident angle $\theta_1=30°$ and the louver angle $\theta_2=30°$ in FIG. 7. The positive direction of normal 610 is indicated by the direction of the arrow, which is pointing to the right-hand side of the page. The positive direction is the same for reference normals 610' and 610", each parallel to normal 610. In FIG. 7, angles $\theta_1$, and $\theta_2$ are measured with respect to the negative X-axis, while angle $\theta_3$ is measured with respect to the positive Y-axis of the Cartesian coordinate system defined earlier.

Louver member 608B has been illustrated as a curved louver member, specifically a vertical circular arc segment with an arc angle of about thirty degrees (30°). The plane tangent to the louver at the center of the louver member is oriented at an angle of about thirty degrees (30°) with respect to the normal 610'. As such, the incoming signal light 110A~110C is received at a single angle relative to the louver screen 600 and redirected into a range of angles. More specifically, image signal light ray 110A is striking at about the center of louver member 608B and is therefore directed through viewing side 104 in a direction approximately normal to the surface of viewing side 104. Image signal light ray 110B is striking near the first end 206 of louver member 608B and is therefore directed through viewing side 104 at first angle 612. Image signal light ray 110C is striking near the second end 208 of louver member 608B and is therefore directed through the viewing side 104 at a second angle 614.

FIG. 6 depicts the cross sectional view of louver members in an XY plane. In at least one embodiment, the cross section of louver member 608B is a circular arc as shown in FIG. 6 and the louver members are exposed and constitute a portion of the viewing side of the screen. The midpoint of the arc is oriented at angle of thirty degrees (30°) with respect to the positive Y-axis and the louver member 608B subtends an arc angle of about twenty to forty degrees (20°~40°.) The image light 110A has an incident angle 620 of about sixty degrees (60°) when it impinges on louver member 608B. This curved louver will reflect a collimated light beam, such as those represented by the light rays 110A, 110B and 110C, into a diverging beam that is spread between the first and second angles 612 and 614, symmetrical about 110B. The angles of the reflected beams 612 and 614 relative to normal 610 are both between about twenty to forty degrees (20°~40°), providing a vertical viewing range, Vr, which is depicted in FIGS. 1 and 11~15, of about fourth to eighty degrees (40°~80°).

FIG. 8 presents a top view of louver member 608B. The curve 608B shown in FIG. 8 depicts a cross sectional view of the louver member in a YZ plane, and is symmetrical about the Y-axis. In this view the image signal light 110 strikes the louver member 608B from an origin below the plane of the paper. The image signal light 110 is reflected by the louver member and may emerge from the viewing side in a direction that is above, below or in the plane of the paper. For simplicity of illustration, FIG. 8 illustrates the projection of the incoming and exiting rays in the plane of the paper.

The following description of the ray traces applies to the projection of the light rays onto the plane of the paper, i.e. the YZ plane as indicated by the Cartesian coordinate axes. The incoming rays 110A 110B and 110C are parallel to the Y-axis. The plane 820 that is tangent to the center point of the intersecting curve 608B is perpendicular to the Y-axis. In at least one embodiment where the louver members are exposed and constitute a portion of the front side of the screen and the normals to the tangents 800, 802 at both the first end 804 and the second end 806 of louver member 608B is oriented at an angle of forty-four degrees (44°) to the positive Y-axis as shown in FIG. 8. The projection onto the YZ plane of the image signal light ray 110A strikes at about the center of louver member 608B perpendicular to the surface and is therefore reflected back onto itself.

Image signal light ray 110B is striking near the first end 804 of louver member 608B and is directed off at a first angle 808. Similarly, image signal light ray 110C is striking near the second edge 806 of louver member 608B and is directed off at a second angle 810. Other image signal light rays are distributed over the surface of 608B and the reflected rays are distributed in between the extreme angles 808 and 810. In at least one embodiment, the extreme angles, i.e. the first and second angles 808 and 810 are both about eighty-eight degrees (88°), thus providing a horizontal viewing range, which is the sum of angles 808 and 810, of about one hundred seventy six degrees (176°). In another embodiment, 608B has a varying curvature across to tailor the angular intensity of the reflected beam. In yet another embodiment varying curvature of 608B produces a total viewing angle, Vh, of one hundred eighty degrees (180°) and Lambertian distribution of angular intensity distribution.

The grooved side 200 as described above may be advantageous in certain embodiment configurations. Referring to FIG. 6, for a rear projection screen image signal light 110 encounters second surface 606 at a near normal angle and therefore may experience less reflection loss at the interface. Similarly, for a front projection screen, a grooved viewing side 104 provides a similar advantage. In addition, the grooves are at an oblique angle from the Y-axis, i.e., the normal of the louver screen, the reflections from the ambient is redirected in general into directions away from the views. This helps to improve the contrast of the screen. In at least one embodiment, an additional transparent conformal coating may be applied over louver members 608 and second surfaces 606 so as to provide an antireflective coating, enhanced durability, and or enhance ease of maintenance.

Returning again to FIG. 2, louver members 122C~122F are each illustrated as having four sections for ease of discussion and illustration. It is to be understood that each louver member may have one section or, as shown, may consist of many identifiable sections. The typical length of the sections, measured along a center curve, such as 230, is about ten to two hundred (10-200)μm. Moreover, in at least one embodiment, each segment, e.g., 222 or 226, is a separate identifiable louver member. In addition, each louver member 122 may have a length about equal to the length 232 of transparent layer 120, or a fraction thereof.

In at least one embodiment, the louver members 122 within louver screen 124 are substantially identical. In yet another alternative embodiment the louver members 122 within louver screen 124 may be different from one to another, such as for example a mixture of flat and shaped louvers having elliptical and/or cylindrical mirror segments, and/or a mixture of louvers with different sized elliptical and/or cylindrical mirror segments with flat louvers, and/or a mixture of louvers with random shapes and sizes. In other words, in at least one alternative embodiment the plurality of louver members 122 may be sub-grouped, each sub-group consisting of at least one louver member. In such a configuration, the one or more members within each sub-group may be substantially identical or different from one another, and may be substantially identical or different from the members of another subgroup. In at least one embodiment of such a configuration, a sub-group is a pixel of the screen.

In at least one embodiment, louver members 122 are physically reflective surfaces. More specifically, in one embodiment each louver member 122 is a light reflective material or is established from a light reflective material such as metal (for example, without limitation, silver or aluminum) or a good reflector (for example, Titanium dioxide or aluminum oxide) or a conglomerate of fine particles made of these reflective materials. The size of the particles typically ranges from about one to one hundred (1-100) μm. Whether a physical structure or a coated structure, the light reflective material is sufficiently thick so as to be non-light transmissive. In an embodiment utilizing silver or aluminum, the thickness of the silver or aluminum material may be about zero point one (0.1)μm thick.

In an alternative embodiment, louver members 122 are established from a light transmissive material having a different index of refraction from transparent layer 120. As the indices of refraction are different, louver members 122 will bend and/or reflect light in specific ways depending on the angle of incidence of light provided through first side 200.

In yet another alternative embodiment, louver members 122 are coated with a holographic film, or textured so as to provide physical relief holograms. In at least one such embodiment, these hologram segments are coated with reflective material to further argument the dispersion of light.

In at least one embodiment, transparent layer 120 and, more specifically, louver screen 124 is flexible. Such flexibility permits louver screen 124 to bend or otherwise contort as may be desired in certain viewing locations and/or to withstand physical stress and/or abuse. In at least one embodiment, the flexibility permits louver screen 124 to be rolled away when not in use. In at least another embodiment, the louver screen 124 is flexible and attached to another flexible backing to enhance the physical durability while maintaining the flexibility. The backing could be opaque for front projection screen.

FIGS. 9 and 10 conceptually illustrate different arrangements of the louver members. As shown in FIG. 9, in at least one embodiment, louver members 122 are arranged in straight parallel rows 900 across louver screen 124. An alternative embodiment is shown as FIG. 10, wherein the louver members 122 are arranged in curved rows 1000 with equal spacing therebetween. Image source 118 is positioned at a distance along the Y-axis and oriented to direct image light into the plane of the high contrast projection system 100. Location 1002 is the projection of the location of the projector on to the plane of the screen. In at least one embodiment such as that shown in FIG. 10, the curved rows 1000 are concentric to location 1002. Moreover, louver row 1004 is an arc section of circle 1006 having radius 1008 extending from center location 1002 at the image source 118.

In light of the above description of louver screen 124, the conceptual depiction of FIG. 1 may be more fully appreciated. Specifically, the apparent solid reflective surface provided by louver members 122 from the perspective of image source 118 insures that image signal light 110 from image source 118 is directed towards an observer. In marked contrast, the majority of ambient light (shown as thick dotted arrows 112) incident upon the viewing side 104 of louver screen 124 passes through louver screen 124 between the louver member 122. Ambient light 112 has a small probability of encountering the louver members and being reflected.

In the event ambient light 112 encounters a louver member 122, the alignment of louver members 122 is such that ambient light 112 is in general reflected in a direction either toward the back side 106 of the screen 102, or back out of the viewing side 104, but in a direction away from the observer instead of back towards the observer. In at least one embodiment, the first or the viewing side 104 and the back side 106 of screen 100 are both smooth and will reflect a fraction of the ambient light. As such, this reflected ambient light may be superimposed on the source image. In at least one embodiment, an antireflective coating, and or grooves are applied to the viewing side 104 and/or back side 106 so as to reduce the amount of reflected ambient light. With respect to typical front or rear projection screens, the light-room and dark-room contrast properties of the high contrast projection system 100 are still quite advantageous even when such grooving and/or antireflective coatings are not provided.

To further improve contrast and reduce the reflection of ambient light 112, in at least one embodiment the case 116 has at least one light absorbing back panel 108 proximate to the louver screen 124 (specifically, the back side 106, as shown). Indeed, in at least one embodiment, substantially all internal surfaces of case 116 are light absorbing surfaces.

The light absorbing property of back panel 108 is achieved in at least one embodiment by the use of black material or black matrix material, as a coating for back panel 108 or as a component of the material used to fabricate case 116. As used herein, "black" is defined as the visual impression experienced when no visible light reaches the human eye. This condition provides a contrast with white. Pigments that absorb light rather than reflect it back to the eye appear to be black. A black pigment may be a very dark shade of grey, or may be a combination of several pigments that collectively act to absorb all colors. Black material therefore, as used herein, is understood and appreciated to be material that does not reflect and/or substantially absorbs the majority of visible light incident upon the black material.

Figure 11:
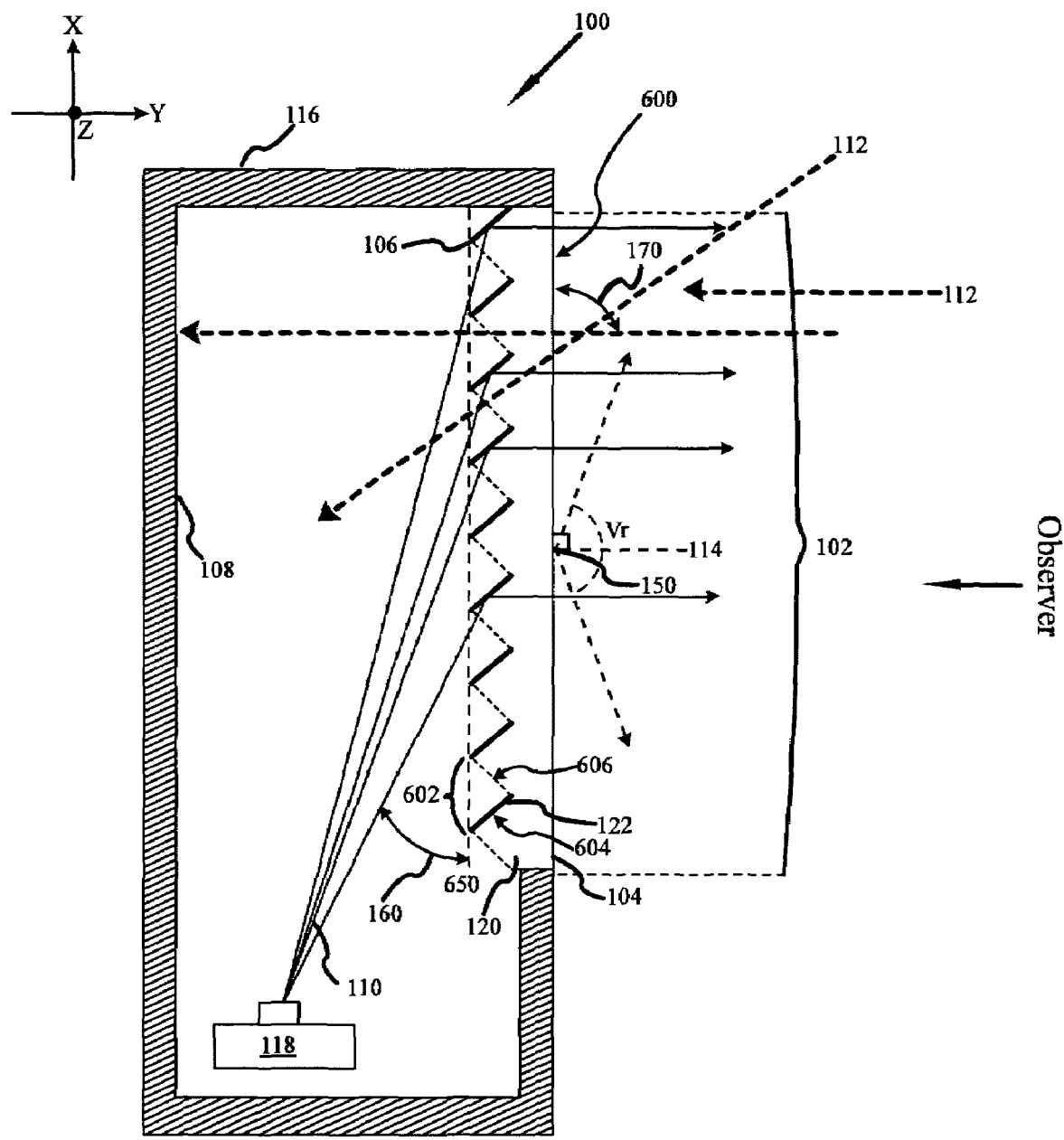
FIG. 11 is a side view of a high-contrast projection system according to an alternative.

FIG. 11 illustrates a grooved louver screen 600 as introduced in FIG. 6, for use in a high contrast projection system 100 substantially similar to that shown in FIG. 1. More specifically, whereas in FIG. 1 the back side 106 is substantially flat, in FIG. 11 the back side 106 is grooved with each louver member 122 provided upon, or as the first surface 604 of, each groove 602.

FIGS. 1 and 11 illustrate embodiments of high contrast projection system 100 configured for rear projection, as image source 118 is disposed within case 116. More specifically, for high contrast projection system 100 embodiments configured for rear projection, the image signal light 110 is presented to the back side 106 of louver screen 124, 600.

FIGS. 12 and 13 illustrate alternative embodiments of high contrast projection system 100 configured for front projection, as the image source 118 is external to case 116. More specifically, for high contrast projection system 100 embodiments configured for front projection, the image signal light 110 is presented to the front side of the louver screen 1200, 1300. In such embodiments, case 116 may be more appropriately termed a backplane support or frame.

With respect to FIG. 12, the louver screen 1200 is substantially identical to the louver screen 124 of FIG. 1, both in function and in structure. In the embodiment shown in FIG. 12, the orientation of louver screen 1200 has been reversed such that the louver members 122 are adjacent to the viewing side 104. Image signal light 110 provided by image source 118 is again provided at a low angle relative to the louver screen 1200, and as such may encounter an apparent solid reflective surface provided by louver members 122. Ambient light 112 incident upon the viewing side 104 has a greater chance of passing through louver screen 1200 between louver members 122 than encountering louver members 122 and being reflected back towards an observer.

As louver screen 1200 is formed from transparent layer 120, the viewing side 104 and back side 106 are both transparent as well. More specifically, the majority of ambient light 112 incident upon the viewing side 104 will pass through the viewing side 104, through transparent layer 120 and through back side 106. A small fraction of the incident ambient light 112 is reflected as described earlier.

Ambient light thus encounters light absorbing back panel 1202. In at least one embodiment, light absorbing back panel 1202 is coupled to back side 106. Moreover, light absorbing back panel 1202 may be established by coating back side 106 with a black material as described above. Light absorbing back panel 1202 may also be a component of the case 116 (i.e. backplane support or frame) to which louver screen 1200 is attached. In at least one embodiment where louver screen 1200 is flexible, case 116 is also flexible so as to permit, for example, roll away storage of high contrast projection system 100.

To further assist image signal light 110 in reaching louver members 122, an antireflection coating as described above may be disposed upon the viewing side 104 and the back side 106. Such an antireflection coating may also reduce the reflection of ambient light 112 incident upon viewing side 104; however, as described above the improved contrast of high contrast projection system 100 and reduced ambient reflection is principally due to ambient light 112 passing through louver screen 1200 and being absorbed by light absorbing back panel 108.

With respect to FIG. 13, the louver screen 1300 is substantially identical to the louver screen 600 of FIG. 11, both in function and in structure. The orientation of louver screen 1300 has been reversed such that the louver members 122 are adjacent to the viewing side 104. Image signal light 110 provided by image source 118 is again provided at a low angle relative to the louver screen 1300, and as such may encounter an apparent solid reflective surface provided by louver members 122. Ambient light 112 incident upon the viewing side 104 has a greater chance of passing through louver screen 1300 between louver members 122 than encountering louver members 122 and being reflected. The ambient light 112 is absorbed by light absorbing back panel 1302 joined to louver screen 1300.

As in the embodiment shown in FIG. 12, in at least one embodiment, light absorbing back panel 1302 is coupled to back side 106. Moreover, light absorbing back panel 1302 may be established by coating back side 106 with a black material as described above. Light absorbing back panel 1302 may also be a component of the case 116 (i.e. backplane support or frame) to which louver screen 1300 is attached. In at least one embodiment where louver screen 1300 is flexible, case 116 is also flexible so as to permit, for example, roll away storage of high contrast projection system 100.

With front projection embodiments as shown in FIGS. 12 and 13, coupling the light absorbing back panel 108 to the back side 106 may advantageously simplify fabrication processing as multiple processing steps upon the transparent layer 112 may be avoided. Moreover, the fabrication process for a rear projection louver screen 124, 600 or front projection louver screen 1200, 1300 may be substantially identical, thereby permitting an advantageous cost savings in manufacturing and/or service maintenance should replacement of the louver screen be required by a consumer.

FIGS. 14 and 15 illustrate alternative embodiments of high contrast projection system 100 wherein the image source is 118 provides image signal light 110 to the bottom of the transparent layer 104, rather than to either the viewing side 104 or the back side 106. With respect to FIGS. 14 and 15 the louver screen 1400, 1500 is similar to the louver screen 124 of FIG. 1, however the thickness 204 (see FIG. 2) of transparent layer 120 is considerably thicker. More specifically, the thickness is sufficient to accommodate presentation of all image signal light 110 to the bottom surface 1402, 1502 of the louver screen 1400, 1500. In addition, the bottom surface 1402, 1502 is angled so as to be perpendicular to central light ray 100 presented from image source 118.

As shown, light rays 110 travel from the image source, through the bottom surface 1402, 1502 and strike louver members 122. More specifically, light rays 110 do not experience internal reflection from the viewing side 104 or the back side 106, rather they travel in a generally straight path from the image source 118 to the louver members 106.

As described above, ambient light 112 incident upon the viewing side 104 will pass through the viewing side 104, through transparent layer 120 and through the back side 106. A small fraction of the incident ambient light 112 is also reflected as described above.

Ambient light 112 thus encounters light absorbing back panel 1404 or 1504 depending upon configuration of high contrast projection system 100 as shown in FIG. 14, louver screen 1400 or as shown in FIG. 15, louver screen 1500. In the case of FIG. 14, light absorbing back panel 1404 may be a component of case 116 (i.e. backplane support or frame) to which louver screen 1400 is attached. In the case of FIG. 15, light absorbing back panel 1504 may be a coupled to back side 106. Light absorbing back panel 1504 may be established by coating back side 106 with a black material as described above.

With either embodiment as shown in FIG. 14 or 15, to further assist image signal light 110 in reaching louver members 122, an antireflection coating as described above may be disposed upon the viewing side 104 and/or the bottom surface 1402, 1502. Such an antireflection coating may also reduce the reflection of ambient light 112 incident upon viewing side 104, however, as described above the improved contrast of high contrast projection system 100 and reduced ambient reflection is principally due to ambient light 112 passing through louver screen 1200 and being absorbed by light absorbing back panel 108.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A high contrast projection system, comprising:
a screen provided by a transparent layer of material having a plurality of light reflective member between a viewing side and opposite thereto a back side, the screen structured and arranged to discriminate an image signal from an ambient light incident upon the viewing surface, the image signal light redirected into a range of angles, the range centered about a normal to the viewing side, the majority of ambient light directed generally through the screen towards the back side; and
an opaque light absorbing back panel adjacent to the side.

2. The system of claim 1, wherein the screen is structured and arranged to discriminate the image signal presented from a first location from the ambient light presented from a second location.

3. The system of claim 1, wherein the screen presents a continuous reflective area relative to a low angle of approach to the screen and a fractional reflective area relative to a high angle of approach to the screen.

4. The system of claim 1, wherein in a first instance the image signal is provided through the back side of the screen, in a second instance the image signal is provided through the front side of the screen, and in a third instance the image signal is provided through a bottom of the screen.

5. The system of claim 1, wherein the louver members are arranged in curved rows, the curved rows concentric to an image signal source.

6. The system of claim 1, wherein the opaque light absorbing back panel is positioned physically apart from the transparent layer back side.

7. A high contrast projection system, comprising:
a louver screen provided by a transparent layer of material having a plurality of reflective louver members between a viewing side and opposite thereto a back side, the louver screen structured and arranged to discriminate an image signal light received directly from an image source from an ambient light incident upon the viewing surface, the image signal light received at a low delivery angle relative to the louver screen and redirected into a range of angles, the range centered about a normal to the viewing side, the majority of the ambient light directed generally through the screen towards the back side; and
an opaque light absorbing back panel adjacent to the louver screen back side.

8. The system of claim 7, wherein the opaque light absorbing back panel is positioned physically apart from the louver screen back side.

9. The system of claim 7, wherein in a first instance the image signal is provided through the back side of the screen, in a second instance the image signal is provided through the front side of the screen, and in a third instance the image signal is provided through a bottom of the screen.

10. The system of claim 7, wherein the louver members are structured and arranged to receive image light presented at a single angle from a first direction and scatter the light across a predetermined range of angles relative to a second direction.

11. The system of claim 7, wherein the louver members are arranged in curved rows, the curved rows concentric to an image signal source.

12. A high contrast projection system, comprising:
a louver screen provided by a transparent layer of material having a plurality of reflective louver members between a viewing side and opposite thereto a back side, the louver screen structured and arranged to receive an image signal light presented from an origin direction at a single angle and redirect the image signal light into a plurality of predetermined angles relative to the viewing side; the louver screen further structured and arranged to direct an ambient light incident upon the viewing side through the louver screen to the back side; and
an opaque light absorbing back panel adjacent to the louver screen back side.

13. The system of claim 12, wherein in a first instance the image signal is provided through the back side of the screen, in a second instance the image signal is provided through the front side of the screen, and in a third instance the image signal is provided through a bottom of the screen.

14. The system of claim 13, wherein the louver members are arranged in curved rows with equal spacing therebetween, the curved rows concentric to an image signal source.

15. The system of claim 12, wherein the louver members are arranged in straight parallel rows.

16. The system of claim 12, wherein the louver screen includes a plurality of shaped louver members.

17. The system of claim 16, wherein the shaped louver members are grouped into at least one subgroup, the louver members within each subgroup systematically arranged.

18. The system of claim 16, wherein the shaped louver members are grouped into at least one subgroup, the louver members within each subgroup randomly distributed.

19. The system of claim 12, wherein the louver screen is flexible.

20. The system of claim 12, wherein the louver screen further includes an angled bottom surface, the image signal light presented to the angled bottom surface at about a normal to the bottom surface.

21. The system of claim 12, wherein the opaque light absorbing back panel is positioned physically apart from the louver screen back side.

22. A high contrast projection system, comprising:
a transparent layer of material having a viewing side and parallel thereto a back side
a plurality of louver members disposed between the viewing side and the back side, the louver members structured and arranged to present a continuous reflective area relative to a low angle of approach to the transparent layer and a fractional reflective area relative to a high angle of approach to the transparent layer;
an opaque light absorbing back panel adjacent to the transparent layer back side.

23. The system of claim 22, wherein the louver members are arranged in straight parallel rows.

24. The system of claim 22, wherein the louver members are arranged in curved rows with equal spacing therebetween.

25. The system of claim 22, wherein each louver member is a shaped louver member.

26. The system of claim 22, wherein the louver members discriminate an image signal from an ambient light incident upon the viewing surface, the image signal light received at a low delivery angle relative to the louver screen and redirected into a range of angles, the range centered about a normal to the viewing side, the majority of the ambient light directed generally through the transparent layer towards the back side.

27. The system of claim 26, wherein the opaque light absorbing back panel is positioned physically apart from the transparent layer back side.

28. The system of claim 11, wherein in a first instance the image signal is provided through the back side of the screen, in a second instance the image signal is provided through the front side of the screen, and in a third instance the image signal is provided through a bottom of the screen.

29. A high contrast projection system, comprising:
a louver screen having a viewing side and opposite thereto a back side, the louver screen structured and arranged to discriminate an image signal light from an ambient light incident upon the viewing surface, the image signal light redirected into a range of angles, the range centered about a normal to the viewing side, the majority of the ambient light directed generally through the louver screen towards the back side, the louver screen including;
a transparent layer of material;
a plurality of shaped light reflective louver members at least partially disposed within the transparent layer, the louver members arranged to provide a continuous reflective area relative to a low angle of approach to the transparent layer and a fractional reflective area relative to a high angle of approach to the transparent layer;
an opaque light absorbing back panel adjacent to and spaced apart from the louver screen back side; and
an image source optically coupled to the louver screen, the image source operable to provide an image signal light to the louver screen.

30. The system of claim 29, wherein the louver members are arranged in curved rows, the curved rows concentric to an image signal source.

* * * * *

UNITED STATES PATENT AND TRADEMARK OFFICE
CERTIFICATE OF CORRECTION

PATENT NO.         : 7,522,339 B2                                          Page 1 of 1
APPLICATION NO. : 11/284075
DATED              : April 21, 2009
INVENTOR(S)        : Huei Pei Kuo et al.

It is certified that error appears in the above-identified patent and that said Letters Patent is hereby corrected as shown below:

On the title page, item (54), in "Title", in column 1, line 1, delete "SYSTEN" and insert -- SYSTEM --, therefor.

In column 1, line 1, delete "SYSTEN" and insert -- SYSTEM --, therefor.

In column 2, line 44, after "shown in" delete "1," and insert -- FIGS. --, therefor.

In column 12, line 63, delete "100" and insert -- 110C --, therefor.

In column 13, line 43, in Claim 1, delete "member" and insert -- members --, therefor.

In column 13, line 51, in Claim 1, before "side." insert -- back --.

In column 15, line 10, in Claim 22, delete "side" and insert -- side; --, therefor.

In column 16, line 1, in Claim 28, delete "claim 11" and insert -- claim 22 --, therefor.

Signed and Sealed this

Twenty-second Day of September, 2009

David J. Kappos
*Director of the United States Patent and Trademark Office*